United States Patent
Määttänen et al.

(10) Patent No.: US 10,659,137 B2
(45) Date of Patent: May 19, 2020

(54) APERIODIC AND PERIODIC INDICATIONS FOR BLF AND RLF

(71) Applicant: Telefonaktiebolaget LM Ericsson (publ), Stockholm (SE)

(72) Inventors: Helka-Liina Määttänen, Helsinki (FI); Icaro L. J. Da Silva, Solna (SE); Rui Fan, Beijing (CN); Claes Tidestav, Bålsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/059,298

(22) Filed: Aug. 9, 2018

(65) Prior Publication Data

US 2019/0052342 A1 Feb. 14, 2019

Related U.S. Application Data

(60) Provisional application No. 62/544,601, filed on Aug. 11, 2017.

(51) Int. Cl.

| | |
|---|---|
| H04L 1/00 | (2006.01) |
| H04B 7/08 | (2006.01) |
| H04L 5/00 | (2006.01) |
| H04W 76/18 | (2018.01) |
| H04B 7/06 | (2006.01) |
| H04W 16/28 | (2009.01) |
| H04W 72/04 | (2009.01) |
| H04W 24/08 | (2009.01) |

(52) U.S. Cl.
CPC ........... *H04B 7/088* (2013.01); *H04B 7/0695* (2013.01); *H04L 5/0048* (2013.01); *H04L 5/0053* (2013.01); *H04W 16/28* (2013.01); *H04W 72/046* (2013.01); *H04W 76/18* (2018.02); *H04L 5/0023* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 2010/0265847 | A1* | 10/2010 | Lee ........................ | H04W 48/02 370/254 |
| 2015/0271717 | A1* | 9/2015 | Moon ................... | H04W 76/18 455/437 |
| 2015/0271763 | A1* | 9/2015 | Balachandran ....... | H04W 76/18 370/338 |

(Continued)

OTHER PUBLICATIONS

PCT Notification of Transmittal of the International Search Report and the Written Opinion of the International Searching Authority, Or the Declaration for International application No. PCT/EP2018/071252—dated Nov. 12, 2018.

(Continued)

*Primary Examiner* — Clemence S Han
(74) *Attorney, Agent, or Firm* — Baker Botts, LLP

(57) ABSTRACT

According to certain embodiments, a method (200) for use in a wireless device (305) includes starting a first timer for monitoring a radio link for a radio link failure, wherein the first timer is started based at least in part on: one or more periodic out of sync (OOS) indications associated with the radio link and aperiodic indications obtained from monitoring a beam for a beam link failure. The radio link failure is declared in response to expiry of the first timer.

23 Claims, 9 Drawing Sheets

(56) References Cited

U.S. PATENT DOCUMENTS

| | | | | |
|---|---|---|---|---|
| 2017/0311189 A1* | 10/2017 | Almalfouh | ............ | H04B 17/336 |
| 2017/0374705 A1* | 12/2017 | Mitsui | ................... | H04W 76/18 |
| 2018/0184362 A1* | 6/2018 | Babaei | ................ | H04W 48/10 |
| 2018/0302813 A1* | 10/2018 | Hahn | ................... | H04W 24/08 |
| 2019/0036590 A1* | 1/2019 | Nagaraja | .............. | H04B 17/309 |
| 2019/0089447 A1* | 3/2019 | Sang | ..................... | H04W 40/36 |
| 2019/0182884 A1* | 6/2019 | Deenoo | ................ | H04W 76/18 |
| 2019/0230737 A1* | 7/2019 | Fujishiro | .............. | H04W 74/06 |

OTHER PUBLICATIONS

3GPP TSG RAN WG1 Meeting #88b; Spokane, USA; Source: Huawei, HiSilicon; Title: Link recovery procedure for beam failure (R1-1704230)—Apr. 3-7, 2017.

3GPP TSG RAN WG2 Meeting #95; Gothenburg, Sweden; Title: RLM and RLF in HF NR (R2-164899)—Aug. 22-26, 2016.

3GPP TSG-RAN WG2 Meeting 97bis; Spokane, USA; Source: MediaTek Inc.; Title: RLM and RLF in HF NR (R2-1702770 (Revision of R2-1700898))—Apr. 3-7, 2017.

3GPP TSG-RAN WG2 NR #101bis; Sanya, China; Source: Ericsson; Title: Beam recovery Impact to RLF triggering (Tdoc R2-1805380 (re-sub of R2-1800592))—Apr. 16-20, 2018.

* cited by examiner

APERIODIC AND PERIODIC INDICATIONS FOR BLF AND RLF

PRIORITY

This non-provisional application claims priority to U.S. Provisional Patent Application No. 62/544,601 filed Aug. 11, 2017, which is hereby incorporated by reference in its entirety.

TECHNICAL FIELD

Certain embodiments of the present disclosure relate, in general, to wireless communications, and more specifically to aperiodic and periodic indications for beam link failure (BLF) and radio link failure (RLF). Certain embodiments may relate to the areas of random access and/or beam recovery. Certain embodiments may be implemented using long term evolution (LTE), new radio (NR), or other suitable technology.

BACKGROUND

FIG. 1 illustrates Radio Link Monitoring (RLM) and Radio Link Failure (RLF) procedure in LTE. The purpose of the Radio Link Monitoring (RLM) function in the user equipment (UE) is to monitor the downlink radio link quality of the serving cell in RRC_CONNECTED state. Monitoring is based on the Cell-Specific Reference Signals (CRS). This in turn enables the UE when in RRC_CONNECTED state to determine whether it is in-sync or out-of-sync with respect to its serving cell as described in TS 36.213 V14.3.0, Section 4.2.1.

The UE's estimation of the downlink radio link quality is compared with out-of-sync (OOS) and in-sync (IS) thresholds, Qout and Qin for the purpose of RLM. These thresholds are expressed in terms of the Block Error Rate (BLER) of a hypothetical Physical Downlink Control Channel (PDCCH) transmission from the serving cell. Specifically, Qout corresponds to a 10% BLER while Qin corresponds to a 2% BLER. The same threshold levels are applicable with and without Discontinuous Reception (DRX).

The mapping between the CRS based downlink quality and the hypothetical PDCCH BLER is up to the UE implementation. However, the performance is verified by conformance tests defined for various environments, as described in 3GPP TS 36.521 V14.3.0 and 3GPP TS 36.133 V14.2.0.

The RLF is triggered when timer T310 expires, Random access problems have occurred or too many Radio Link Control (RLC) retransmissions have occurred.

Relating to RLM in NR, it has been agreed that for connected mode a UE declares RLF upon timer expiry due to DL OOS detection, random access procedure failure detection, and RLC failure detection.

The physical layer performs out of sync/in sync indications and RRC declares RLF. It has also been agreed that RLF is triggered based on RLC max number of retransmission reached for a single leg. One of the remaining open issues was whether there will be per cell IS/OOS indications or not. However, at least periodic IS/OOS indications are planned. Additionally, it is expected that the LTE model for RLM/RLF should also be adopted as baseline for NR.

In NR, in order to improve coverage and increase data rate, beamforming is widely used. With beamforming, network can transmit user specific data via narrow beams which can improve Signal-to-Interference-plus-Noise Ratio (SINR). One issue with beam-based transmission is that since beams can provide quite narrow coverage, it is possible that suddenly a UE is out of the coverage of the beam. If that occurs, the network would not be able to efficiently schedule data to that UE and/or the UE would not be monitoring the right beam (or beam link pair) used by the network to transmit a control channel (like PDCCH) and the UE would not be able to detect scheduled information. That problem is typically called "beam failure".

3GPP has acknowledged the importance of that problem and started to discuss for 5G a procedure called beam recovery upon the detection of a beam failure for RRC_CONNECTED UEs. In beam recovery, an RRC_CONNECTED UE would perform measurements associated to the quality of the serving link and, if that quality goes below a given threshold, the UE would perform beam recovery. The procedure aims to solve the situation where the TX and/or RX beams of the NR radio base station (e.g. a gNodeB) and the UE have become misaligned, but where there are additional beams that could be used to maintain the connection between the gNodeB and the UE.

The beam failure recovery procedure includes the following aspects:

Beam failure detection: Here the UE monitors a certain periodic reference signal (RS) to estimate the quality of the serving link. Once the quality of that link falls below a certain threshold, the UE initiates beam recovery.

New candidate beam identification: Once beam failure has been detected, the

UE tries to identify a new beam that would provide adequate quality. The UE then searches for a specific Reference Signal (RS), which is transmitted from the same node, but in difference candidate beams. During this search procedure, the UE may also change its RX beam.

Beam failure recovery request: Once a new candidate beam has been found, the UE transmits an UL signal using certain UL resources. The gNodeB is prepared to receive the UL signal in these UL resources, and can determine which candidate beam the UE selected based on the receive UL signal.

Beam failure recovery response: When the gNodeB has received the beam failure recovery request, it sends a DL response to indicate to the UE that it received the request, using the knowledge of the new beam. UE monitors gNB response for beam failure recovery request. Once the UE has successfully received the response, the beam recovery is complete.

Thus, there have been significant discussions about beam recovery (BR) for NR, and the associated monitoring procedure. In RAN1, it was agreed that a beam failure event occurs when the quality of beam pair link(s) of an associated control channel falls low enough. As the user equipment (UE) is monitoring downlink (DL) quality, such a beam link monitoring (BLM) would be equivalent to monitor the quality of the PDCCH. According to RAN1, such IS/OOS indication is at least periodical and such indicator is irrespective of number of beams in a cell. Further, RAN1 has agreed that there will be periodic reference signals (RS), synchronization signal block (SSB) or Channel State Information-Reference Signal (CSI-RS) that represents the PDCCH quality. Also, that there can be aperiodic indications to assist Radio Link Failure (RLF) if the monitored RS is same for Beam Link Failure (BLF) and RLF. Any such assistance implies that there is a connection between beam link failure and radio link failure.

The beam recovery procedure has been designed to recover a lost beam, using another beam from the same cell.

Since the UE re-establishes connection with the same cell, the overhead of the procedure is small: e.g., the UE is not required to perform cell reselection, or acquire system information. In contrast, if the UE triggers RLF, it may have to reselect a new cell, and acquire system information, with the associated overhead and delay.

SUMMARY

It is the aim of the invention to improve radio link failure declaration. The present disclosure describes different possible interactions between aperiodic beam failure related indications and radio link monitoring processes. The present disclosure also includes the details of when the UE assumes that a beam failure related OOS event or beam recovery IS related event are informed to higher layers.

According to certain embodiments, a method for use in a wireless device includes starting a first timer for monitoring a radio link for a radio link failure, wherein the first timer is started based at least in part on: one or more periodic out of sync (OOS) indications associated with the radio link and aperiodic indications obtained from monitoring a beam for a beam link failure. Radio link failure is declared in response to expiry of the first timer.

According to certain embodiments, a wireless device includes one or more interfaces and processing circuitry. The one or more interfaces are configured to receive one or more periodic out of sync (OOS) indications associated with a radio link and receive aperiodic indications obtained from monitoring a beam for a beam link failure. The processing circuitry is configured to start a first timer for monitoring the radio link for a radio link failure. The first timer is started based at least in part on the one or more periodic OOS indications and the aperiodic indications obtained from monitoring the beam for the beam link failure. The processing circuitry declares radio link failure in response to expiry of the first timer.

According to certain embodiments, a computer program product includes a non-transitory computer readable storage medium having computer readable program code embodied therein. The computer readable program code includes computer readable program code for starting a first timer for monitoring a radio link for a radio link failure. The first timer is started based at least in part on one or more periodic out of sync (OOS) indications associated with the radio link and aperiodic indications obtained from monitoring a beam for a beam link failure. The computer readable program code includes computer readable program code for declaring radio link failure in response to expiry of the first timer.

Embodiments of the present disclosure may provide one or more technical advantages. As an example, a technical advantage of certain embodiments makes an interaction between beam link monitoring and radio link monitoring. Other technical advantages will be apparent to those of ordinary skill in the art.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
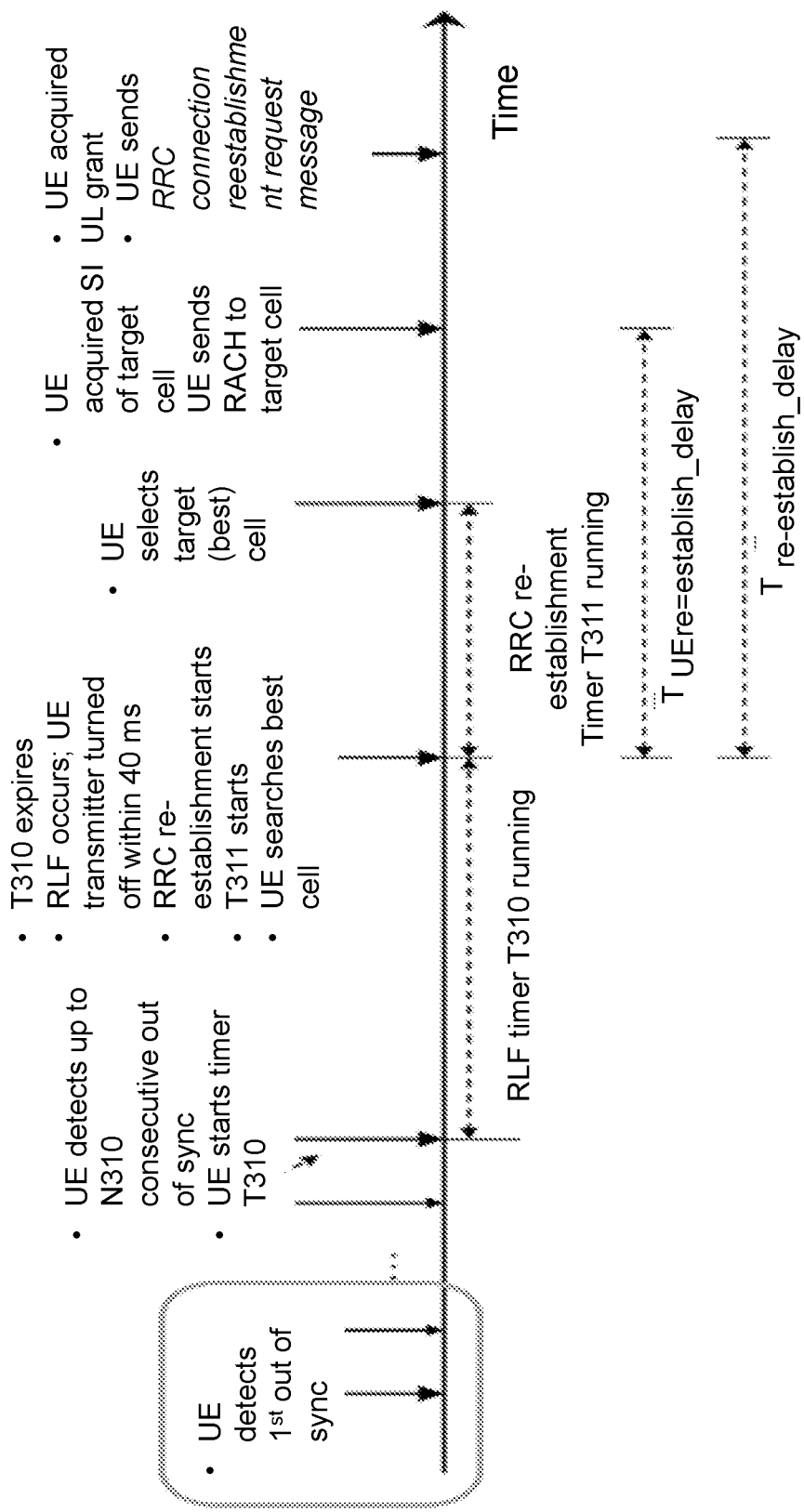
FIG. 1 illustrates Radio Link Monitoring (RLM) and Radio Link Failure (RLF) procedure in LTE; in accordance with certain embodiments.

A beam failure event occurs when the quality of beam pair link(s) of an associated control channel falls low enough. As the user equipment (UE) is monitoring downlink (DL) quality, such beam link monitoring (BLM) would be equivalent to monitor the quality of the Physical Downlink Control Channel (PDCCH). The monitoring may take the form of in-sync (IS) and out-of-sync (OOS) indications: an IS indication indicates that the quality is currently good, whereas an OOS indication indicates that the quality is currently bad. Beam link monitoring is configured independently from radio link monitoring, and the two monitoring processes may use different reference signals. Another procedure is beam recovery, which may be triggered after a certain number of OOS indications from the beam link monitoring process. The following events related to beam recovery may be standardized to affect to the occurrence of RLF:

aperiodic OOS indication, from either monitored CSI-RS or SSB.

aperiodic IS indication from either CSI-RS or SSB aperiodic indication based on the number of beam recovery attempts aperiodic indication based on the time spent performing beam recovery aperiodic indication based on successful beam recovery According to a preferred embodiment, a timer is started based on the number of periodic OOS indications and the number of aperiodic indications from the beam recovery procedure, and RLF is declared when the timer expires. The periodic OOS indications may be based on the quality of a periodic reference signal. In LTE, the timer is called T310. Additionally, a periodic OOS indication may be an indication of a radio problem.

According to another embodiment, the timer is started either when a first number of periodic OOS indications have been received or when a second number of periodic OOS indications and a third number of aperiodic indications from beam recovery have been received.

According to certain embodiments, the input to start the timer may be N periodic OOS indications or N-n periodic OOS indications+one aperiodic indication. That is, one aperiodic indication may replace n periodic indications needed to start the timer, where n can be configured from 0 to N. Example, N=5, n=0 or 2. If n=0, the timer starts when the number of periodic OOS indications is more than 5. If n=2, the timer starts when the number of periodic OOS indications is more than 3 (5−2) if one aperiodic indication has arrived, or when number of periodic OOS indications is more than 5 and no aperiodic indication has arrived. In a particular embodiment, the aperiodic indication may be an aperiodic OOS indication or any other aperiodic indication such as those discussed above.

According to certain other embodiments, the input to start the timer may be a first number of periodic OOS indications or a second number of periodic OOS indications+an indication that maximum number of beam recovery attempts has been reached.

According to certain other embodiments, the input to start the timer may be a first number of periodic OOS indications or a second number of periodic OOS indications+an indication that maximum time has been spent on beam recovery.

According to certain other embodiments, the input to start the timer may be a first number of periodic OOS indications or a second number of periodic OOS indications+an indication that beam recovery has been attempted.

According to certain other embodiments, the timer may be "put on hold" if while the timer has been triggered and is running the UE has detected beam failure and has performed either one or a combination of the following actions:
  UE started beam recovery;
  UE has successfully selected a DL beam to be accessed but has not yet received a response from the network confirming the successful recovery;
  UE has successfully selected a DL beam to be accessed but has not yet received a re-configuration from network upon beam recovery;
  UE has successfully selected a DL beam, sent a recovery attempt ad has received a confirmation from the network of a successful recovery via a response message or via a re-configuration message or a combined response/Re-configuration message.

According to certain of these embodiments, "put on hold" may mean that the timer is stopped but not reset or completely forgotten. In other words, the time that has already elapsed is taken into account if later the timer is re-started after being put on hold.

According to certain embodiments, the timer may be "stopped" if, while the timer has been triggered and is running, the UE has detected beam failure and has performed either one or a combination of the following actions:
  UE started beam recovery;
  UE has successfully selected a DL beam to be accessed but has not yet received a response from the network confirming the successful recovery;
  UE has successfully selected a DL beam to be accessed but has not yet received a re-configuration from network upon beam recovery;
  UE has successfully selected a DL beam, sent a recovery attempt ad has received a confirmation from the network of a successful recovery via a response message or via a re-configuration message or a combined response/Re-configuration message.

For certain of these embodiments, "stopped" may mean that the timer is stopped, completely forgotten (i.e. nothing is kept in memory) but not reset (i.e. it is not immediately started again). In other words, the time that has already elapsed is not taken into account if later the timer is re-started.

In another embodiment, the timer is "reset" if while the timer has been triggered and is running the UE has detected beam failure and has performed either one or a combination of the following actions:
  UE started beam recovery;
  UE has successfully selected a DL beam to be accessed but has not yet received a response from the network confirming the successful recovery;
  UE has successfully selected a DL beam to be accessed but has not yet received a re-configuration from network upon beam recovery;
  UE has successfully selected a DL beam, sent a recovery attempt ad has received a confirmation from the network of a successful recovery via a response message or via a re-configuration message or a combined response/Re-configuration message.

For certain of these embodiments, "reset" may mean that the timer is stopped, completely forgotten (i.e. nothing is kept in memory) and re-started (i.e. it immediately started again). In other words, the time that has already elapsed is not taken into account.

According to certain embodiments, it may be beneficial to indicate to higher layers that beam recovery events, such as recovery attempts or a successful recovery. For example, a successful beam recovery should lead to improved channel quality, and, once the UE starts to measure the RS used for RLM after a successful recovery, the number of IS events is likely to increase and at some point, the RLF timer will be stopped. However, if the RLF timer is close to expiring when beam recovery is successfully completed, despite the fact that it is a matter of time to detect the recovery of the link, the UE may declare RLF. For that reason, one could argue that the detection of a successful recovery should immediately stop the RLF timer. However, although a successful beam recovery indicates that the link is very likely to be recovered, periodic IS events are probably a safer mechanism where the higher layers can make sure the link has not only been recovered but is also stable over time. Therefore, the UE should not stop the RLF timer only based upon the occurrence of a successful beam recovery but also based on a configurable number of periodic IS indication (which can be smaller value than the counter equivalent to N311 in LTE). In summary, successful beam recovery can be used together with periodic IS indications to stop RLF timer.

As another example, a possible scenario is that the UE detects a beam failure and starts the preparation for beam recovery such as, for example, by selecting a new beam before sending an associated UL recovery request. During that process, the RLF timer may be running so that while the UE is still trying to recover, an RLF could potentially be declared, despite the high potential of a successful procedure e.g. if the UE has selected a new beam that is strong enough and stable. If as proposed for the successful case the UE also stops the RLF timer even at the recovery attempt, and the attempt is not successful, it will take a longer time until the RLF timer starts again (i.e. based on OOS events) and the UE would be unnecessarily unreachable for much longer. Hence, to avoid the early stop of the RLF timer, a possibility could be to put it on hold during the recovery attempt and, if successful, stop the timer and, if not successful, keep running the timer. In summary, beam recovery attempt can be used to put the RLF timer on hold until successful recovery is confirmed.

According to certain other embodiments, the timer may be "reset" if the previous described conditions occur for multiple processes being monitored which can be associated to multiple RSs (e.g. SSB and CSI-RS) and/or multiple DL beams and/or multiple beam link pairs (BPLs). For example, the timer can be stopped only if the conditions for all processes are fulfilled or if at least for one of the processes.

According to still other embodiments, timer may be stopped if beam recovery is successful.

According to certain embodiments, the method comprises the UE triggering an RLF timer based on the occurrence of beam failure event(s). These can either be notified to the higher layer as an aperiodic OOS event or as a special type of event explicitly associated to beam failure detection.

In a particular embodiment, the triggering is based on a combination of the occurrence of a number of periodic OOS events N310a and the occurrence of a number of aperiodic beam failure events N310b as follows:
RLF timer is triggered if one or any combination of these alternatives are fulfilled:
  Number of (periodic) OOS events>N310a AND number of beam failure event(s)>N310b;
  Number of (periodic) OOS events>N310a OR number of beam failure event(s)>N310b;
  Number of beam recovery failures>N310b.

This condition could also be triggered based on monitoring processes associated to different RS Types. In other words, while (periodic) OOS events can be based on the monitoring of SSB measurement results, occurrence of beam failure can be configured based on CSI-RS.

According to another particular embodiment, timer T310 may be stopped if M-m number of periodic IS indications+a periodic IS indication. That is, an aperiodic IS indications may replace n periodic indication needed to stop T310, where M can be configured from 0 to M.

The method may also comprise the UE stopping an RLF timer based on the occurrence of beam recovery event(s). These can either be notified to the higher layer as an aperiodic IS event or as a special type of event explicitly associated to beam recovery.

According to certain other embodiments, the triggering may be based on a combination of the occurrence of a number of periodic IS events N311a and the occurrence of a number of aperiodic beam recovery events N311b as follows:
RLF timer is stopped IF one or any combination of these alternatives are fulfilled:
  Number of (periodic) IS events>N311a AND occurrence of successful beam recovery;
  Number of (periodic) OOS events>N311a OR occurrence of successful beam recovery;
  Number of (periodic) OOS events>N311a OR attempt to perform beam recovery (e.g. UE was able to select a new beam and send a recovery request, but in that case timer is not stopped or reset but put on hold until the UE can successfully receive a recovery response message and/or can try other beam failure attempts in the case it has not receive the confirmation of a successful procedure;
  Occurrence of a beam recovery attempt;
  Occurrence of a success beam recovery.

These conditions could also be triggered based on monitoring processes associated to different RS Types. In other words, while (periodic) IS events can be based on the monitoring of SSB measurement results, when occurrence of beam failure can be configured based on CSI-RS.

According to certain embodiments, RLF may be triggered when receiving a random access problem indication from MAC. For example, in one embodiment, RLF is not triggered if a timer indicating beam recovery process is ongoing is running. In another embodiment, restart a timer indicating beam recovery process is ongoing is running if K IS indications are received. Stop timer if K+L IS indications are received. K and K+L can be any combination of periodic or aperiodic IS.

Figure 2:
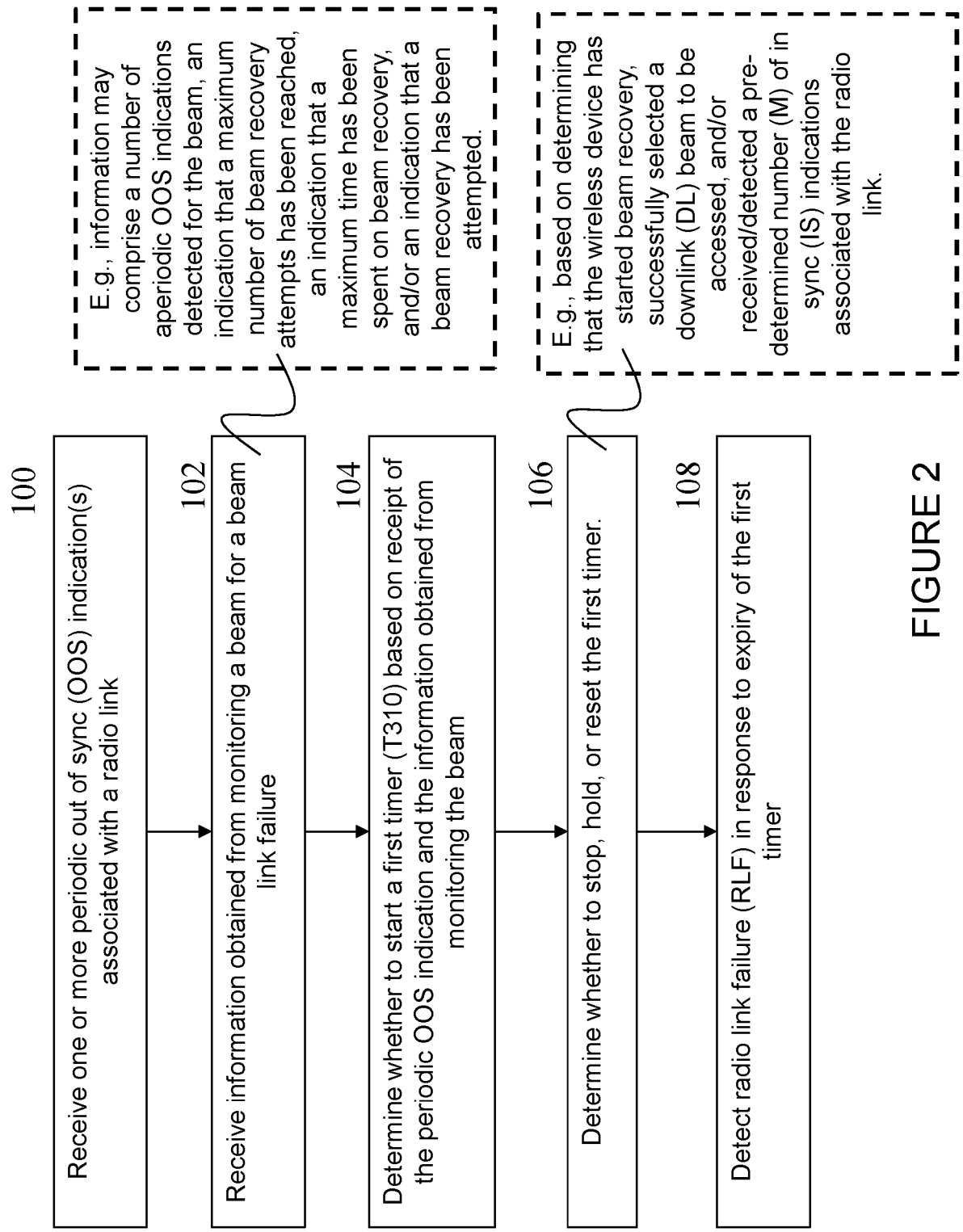
FIG. 2 illustrates an example of a method for use in a wireless device, in accordance with certain embodiments.

FIG. 2 illustrates an example of a method for use in a wireless device, in accordance with certain embodiments. At step 100, the method receives one or more periodic OOS indication(s) associated with a radio link. For example, a higher layer that performs RLF determinations for the wireless device may receive the periodic OOS indications from a lower layer monitoring an RS that the wireless device receives from a transmission point. At step 102, the method receives information obtained from monitoring a beam for a beam link failure. Examples of such information may comprise a number of aperiodic indications (e.g. a number of aperiodic OOS indications) detected for the beam, an indication that a maximum number of beam recovery attempts has been reached, an indication that a maximum time has been spent on beam recovery, and/or an indication that a beam recovery has been attempted. At step 104, the method determines whether to start a first timer (T310) based on receipt of the periodic OOS indication and the information obtained from monitoring the beam. Examples of criteria that can be used for starting T310 may include any of those discussed above. At step 106, the method determines whether to stop, hold, or reset the first timer, for example, based on determining that the wireless device has started beam recovery, successfully selected a DL beam to be accessed, and/or received/detected a pre-determined number (M) of IS indications associated with the radio link. At step 108, if the first timer expires (i.e., the timer has not been stopped/put on hold/reset and proceeds to run and expire), the method detects a RLF.

Figure 3:
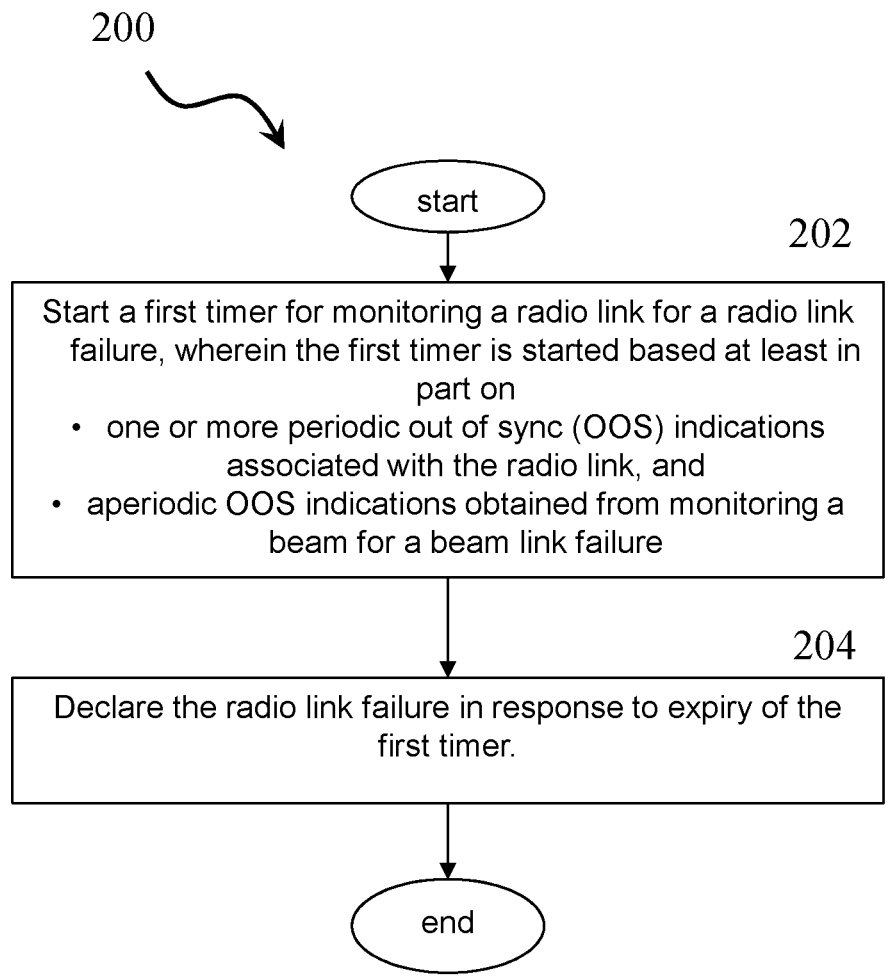
FIG. 3 illustrates another example of a method for use in a wireless device, in accordance with certain embodiments.

FIG. 3 illustrates another example of a method for use in a wireless device, in accordance with certain embodiments. The method begins at step 202 when the wireless device starts a first timer for monitoring a radio link for RLF. According to certain embodiments, the first timer may be started based at least in part on one or more periodic OOS indications associated with the radio link and aperiodic indications obtained from monitoring a beam for a beam link failure. According to certain embodiments, a periodic OOS indication may be an indication of a radio problem.

For example, in a particular embodiment, the first timer may be configured to be started in response to receiving either a first number ($N_{P1}$) of the periodic OOS indications or a second number ($N_{P2}$) of the periodic OOS indications and a number ($N_{A1}$) of the aperiodic indications. The wireless device may perform a determination as to whether the first number ($N_{P1}$) of the periodic OOS indications is greater than a threshold. In a particular embodiment, the second number ($N_{P2}$) of aperiodic indications may be less than the first number ($N_{P1}$) of periodic OOS indications.

As another example, in a particular embodiment, the first timer may be configured to be started in response to a total number of OOS indications being greater than a threshold. The total number of OOS indications may be a function of the periodic OOS indications and the aperiodic indications, and each aperiodic indication may be given more weight than each periodic OOS indication in the function, in a particular embodiment.

According to one embodiment, a single aperiodic indication may replace at least two periodic OOS indications in the comparison of the first number ($N_{P1}$) to the threshold. Thus, when performing the determination of whether the first number ($N_{P1}$) of the periodic OOS indications is greater than the threshold, the wireless device may count a single aperiodic indication as two or more periodic OOS indications.

As another example, in a particular embodiment, the aperiodic indications obtained from monitoring the beam may include an indication that a maximum number of beam recovery attempts has been reached, and the first timer may be started in response to receiving either a first number ($N_{P1}$) of the periodic OOS indications or a second number ($N_{P2}$) of the periodic OOS indications and the indication that the maximum number of beam recovery attempts has been reached. In a particular embodiment, the second number ($N_{P2}$) of periodic OOS indications may be less than the first number ($N_{P1}$) of periodic OOS indications.

As still another example, in a particular embodiment, the aperiodic indications obtained from monitoring the beam may include an indication that a maximum time has been spent on beam recovery, and the first timer may be started in response to receiving either a first number ($N_{P1}$) of the periodic OOS indications or a second number ($N_{P2}$) of the periodic OOS indications and the indication that the maximum time has been spent on beam recovery. In a particular embodiment, the second number ($N_{P2}$) of periodic OOS indications may be less than the first number ($N_{P1}$) of periodic OOS indications.

As still another example, in a particular embodiment, the aperiodic indications obtained from monitoring the beam comprises an indication that a beam recovery has been attempted, and the first timer may be started in response to receiving either a first number ($N_{P1}$) of the periodic OOS indications or a second number ($N_{P2}$) of the periodic OOS indications and the indication that the beam recovery has been attempted. In a particular embodiment, the second number ($N_{P2}$) of periodic OOS indications may be less than the first number ($N_{P1}$) of periodic OOS indications.

According to certain embodiments, the method may further include the wireless device stopping, resetting, or putting the first timer on hold in response to the wireless device performing at least one of:
  starting beam recovery,
  successfully selecting a downlink (DL) beam to be accessed, and
  receiving or detecting a pre-determined number of in-sync (IS) indications associated with the radio link.

For example, in a particular embodiment, the first timer may be stopped, reset, or put on hold in response to determining that the wireless device has successfully selected the DL_beam to be accessed. Here, the phrase 'successfully selected' may include one of the following:
  successfully selecting the DL beam but not yet receiving a response from the network confirming the successful recovery,
  successfully selecting the DL beam but not yet receiving a re-configuration from the network upon beam recovery, or
  successfully selecting the DL beam, sending a recovery attempt, receiving a confirmation from the network of a successful recovery via a response message or via a re-configuration message or a combined response/Re-configuration message.

As another example, the first timer may be put on hold. Thereafter, the wireless device may restart the first timer at a point in time after the first timer is put on hold. When restarting the timer, the wireless device may take into account an amount of time that elapsed before the first timer is put on hold.

As still another example, the first timer may be stopped. Thereafter, the wireless device may restart the first timer at a point in time after the first timer is stopped. When restarting the timer, the wireless device may not take into account an amount of time that elapsed before the first timer is stopped.

In still another example, the first timer may be reset. Thereafter, the wireless device may restart the first timer at a point in time after the first timer is reset. When restarting the timer, the wireless device may not take into account an amount of time that elapsed before the first timer is stopped.

According to certain embodiments, the first timer may be canceled or stopped after detection of a successful beam recovery.

According to certain other embodiments, the first timer may be stopped, reset, or put on hold in response to the wireless device receiving or detecting the pre-determined number of IS indications associated with the radio link. In a particular embodiment, the pre-determined number of IS indications may include a number of periodic IS indications and a number of aperiodic IS indications.

At step 204, the wireless device declares the RLF in response to expiry of the first timer. Additionally, or alternatively, the RLF may be declared in response to the wireless device receiving an indication of a random access problem from MAC while the first timer is not running and/or determining that a number of radio link control (RLC) retransmissions exceeds a pre-determined threshold.

Figure 4:
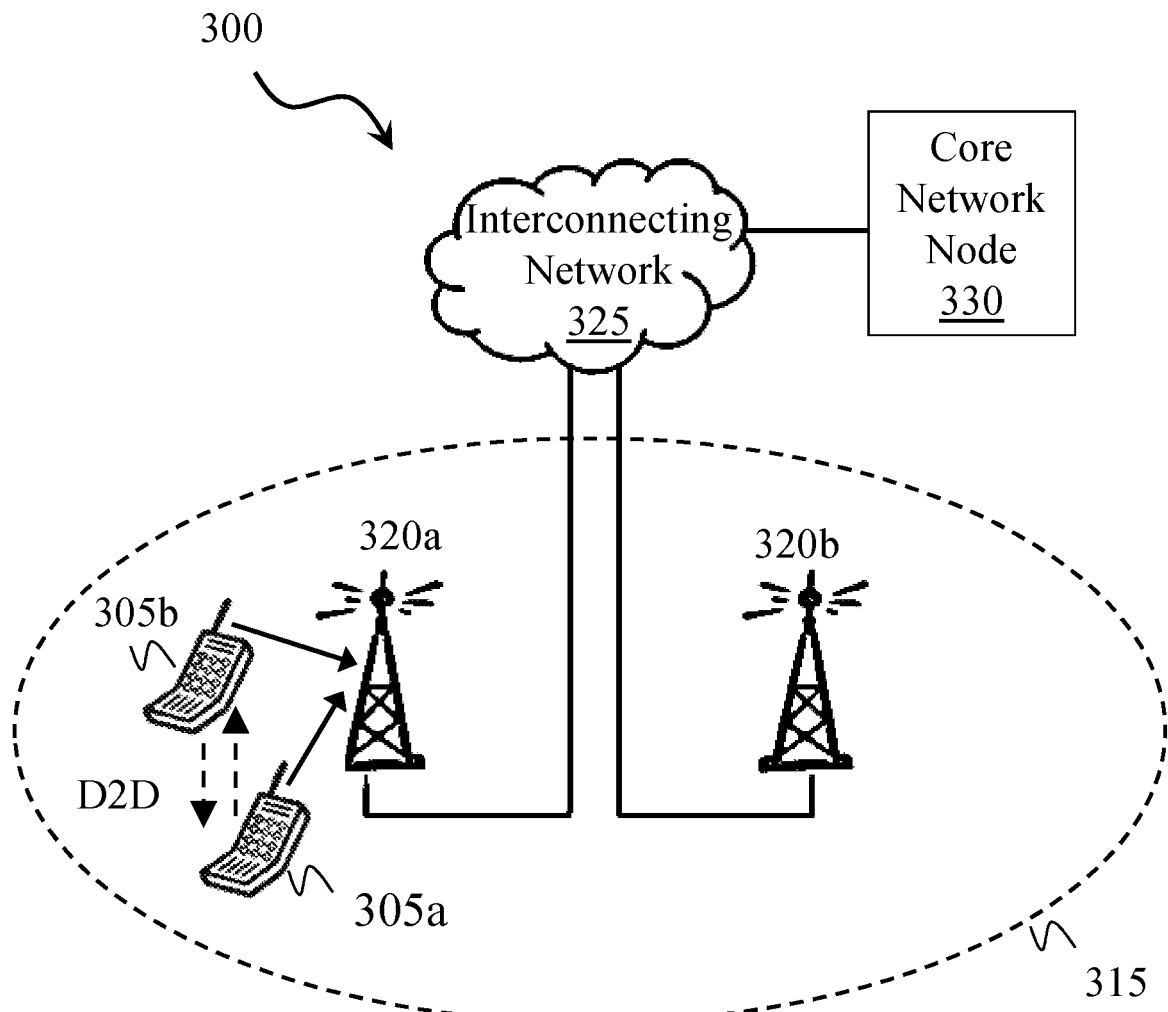
FIG. 4 illustrates an example of a wireless network that may be used for wireless communications, in accordance with certain embodiments.

FIG. 4 illustrates an example of a wireless network 300 that may be used for wireless communications, in accordance with certain embodiments. Wireless network 300 includes a plurality of radio nodes. Examples of radio nodes include wireless devices 305a-310b (such as a UE) and transmission points 320a-320b (such as a gNB, eNB, or base station). The transmission points 320 connect to one or more core network nodes 330 via an interconnecting network 325. Each wireless device 305 within coverage area 315 may be capable of communicating directly with transmission points 320 over a wireless interface. Wireless devices may also be capable of communicating with each other via device-to-device (D2D) communication.

As an example, wireless device 305a may communicate with transmission point 320a over a wireless interface. That is, wireless device 305a may transmit wireless signals and/or receive wireless signals from transmission point 320a. The wireless signals may contain voice traffic, data traffic, control signals, and/or any other suitable information. In some embodiments, an area of wireless signal coverage associated with a transmission point 320 may be referred to as a cell.

According to certain embodiments, wireless device 305 may be interchangeably referred to by the non-limiting term user equipment (UE). Wireless device 305 refers to any type of wireless device communicating with a network node and/or with another wireless device in a cellular or mobile communication system. Examples of wireless devices include target device, device to device (D2D) UE, V2x UE, machine type UE or UE capable of machine to machine (M2M) communication, PDA, PAD, Tablet, mobile terminals, smart phone, laptop embedded equipped (LEE), laptop mounted equipment (LME), USB dongles, etc. Thus, although FIG. 4 illustrates wireless devices 305 as phones, other embodiments may use other types of wireless devices 305. Example embodiments of wireless device 305 are described in more detail below with respect to FIGS. 5-6.

According to certain embodiments, transmission point 320 may be interchangeably referred to by the non-limiting terms radio access node, gNB, eNB, base station, network node, or WAN node. The WAN node can be a UE (e.g. D2D UE) or a network node (e.g., access point, base station, cellular node, etc.). Example embodiments of transmission point 320 are described in more detail below with respect to FIGS. 7-8.

According to certain embodiments, transmission points 320 may interface with a radio network controller. The radio network controller may control transmission points 320 and may provide certain radio resource management functions, mobility management functions, and/or other suitable functions. In certain embodiments, the functions of the radio network controller may be included in transmission point 320. The radio network controller may interface with a core network node 330. In certain embodiments, the radio network controller may interface with the core network node 330 via an interconnecting network 325.

The interconnecting network 325 may refer to any interconnecting system capable of transmitting audio, video, signals, data, messages, or any combination of the preceding. The interconnecting network 325 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 330 may manage the establishment of communication sessions and various other functionalities for wireless devices 305. Wireless devices 305 may exchange certain signals with the core network node using the non-access stratum layer. In non-access stratum signaling, signals between wireless devices 305 and the core network node 330 may be transparently passed through the radio access network. In certain embodiments, transmission points 320 may interface with one or more network nodes over an internode interface. For example, transmission points 320a and 320b may interface over an internode interface.

Although FIG. 4 illustrates a particular arrangement of network 300, the present disclosure contemplates that the various embodiments described herein may be applied to a variety of networks having any suitable configuration. For example, network 300 may include any suitable number of wireless devices 305 and transmission points 320, as well as any additional elements suitable to support communication between wireless devices or between a wireless device and another communication device (such as a landline telephone). The embodiments may be implemented in any appropriate type of telecommunication system supporting any suitable communication standards and using any suitable components and are applicable to any radio access technology (RAT) or multi-RAT systems in which the wireless device receives and/or transmits signals (e.g., data). While some embodiments are described for a particular RAT for the purposes of example and explanation, other embodiments are applicable to any suitable RAT, which may include LTE, LTE FDD/TDD, NR, WCDMA/HSPA, GSM/GERAN, WiFi, WLAN, CDMA2000, etc.

Figure 5:
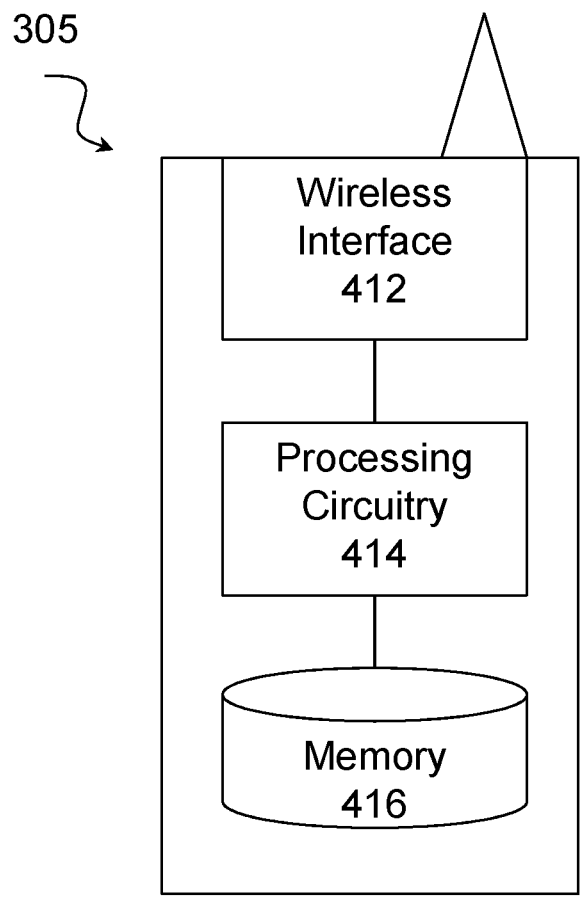
FIG. 5 illustrates an exemplary wireless device, in accordance with certain embodiments.

FIG. 5 is a block diagram of an exemplary wireless device 305, in accordance with certain embodiments. Wireless device 305 includes one or more each of a wireless interface 412, processing circuitry 414 (e.g., comprising one or more processors), and memory 416. In some embodiments, wireless interface 412 includes a transmitter that facilitates transmitting wireless signals to and a receiver that facilitates receiving wireless signals from network node/WAN node/transmission point 320 (e.g., via an antenna), processing circuitry 414 that executes instructions to provide some or all of the functionality described herein as being provided by a wireless device (or UE), and memory 416 stores the instructions executed by processing circuitry 414.

Processing circuitry 414 may include any suitable combination of hardware and software implemented in one or more modules to execute instructions and manipulate data to perform some or all of the described functions of a UE or wireless device 305, such as declaring RLF based at least in part on information used in a beam failure monitoring procedure. For example, in certain embodiments, processing circuitry 414 may start, stop, reset, cancel, and/or put on hold a timer used in an RLF procedure (timer 310) based in part on information used in a beam failure monitoring procedure. In certain embodiments, processing circuitry 414 may include some or all the components discussed with reference to FIG. 6 herein. In certain embodiments, processing circuitry may perform the methods discussed above with respect to FIG. 2, FIG. 3, and/or any of the example embodiments discussed herein. In some embodiments, processing circuitry 414 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 416 is generally operable to store instructions, such as a computer program, software, an application including one or more of logic, rules, algorithms, code, tables, etc. and/or other instructions capable of being executed by a processor. Examples of memory 416 include computer memory (for example, Random Access Memory (RAM) or Read Only Memory (ROM)), mass storage media (for example, a hard drive), removable storage media (for example, a Compact Disc (CD) or a Digital Video Disc (DVD)), and/or or any other volatile or non-volatile, non-transitory computer-readable and/or computer-executable memory devices that store information, data, and/or instructions that may be used by processing circuitry 414 of wireless device 305.

Other embodiments of wireless device 305 may include additional components beyond those shown in FIG. 5 that may be responsible for providing certain aspects of the wireless device's functionality, including any of the functionality described herein and/or any additional functionality (including any functionality necessary to support the solution described herein). As just one example, wireless device 305 may include input devices and circuits, output devices, and one or more synchronization units or circuits, which may be part of the processing circuitry. Input devices include mechanisms for entry of data into wireless device 305. For example, input devices may include input mechanisms, such as a microphone, input elements, a display, etc. Output devices may include mechanisms for outputting data in audio, video and/or hard copy format. For example, output devices may include a speaker, a display, etc.

Figure 6:
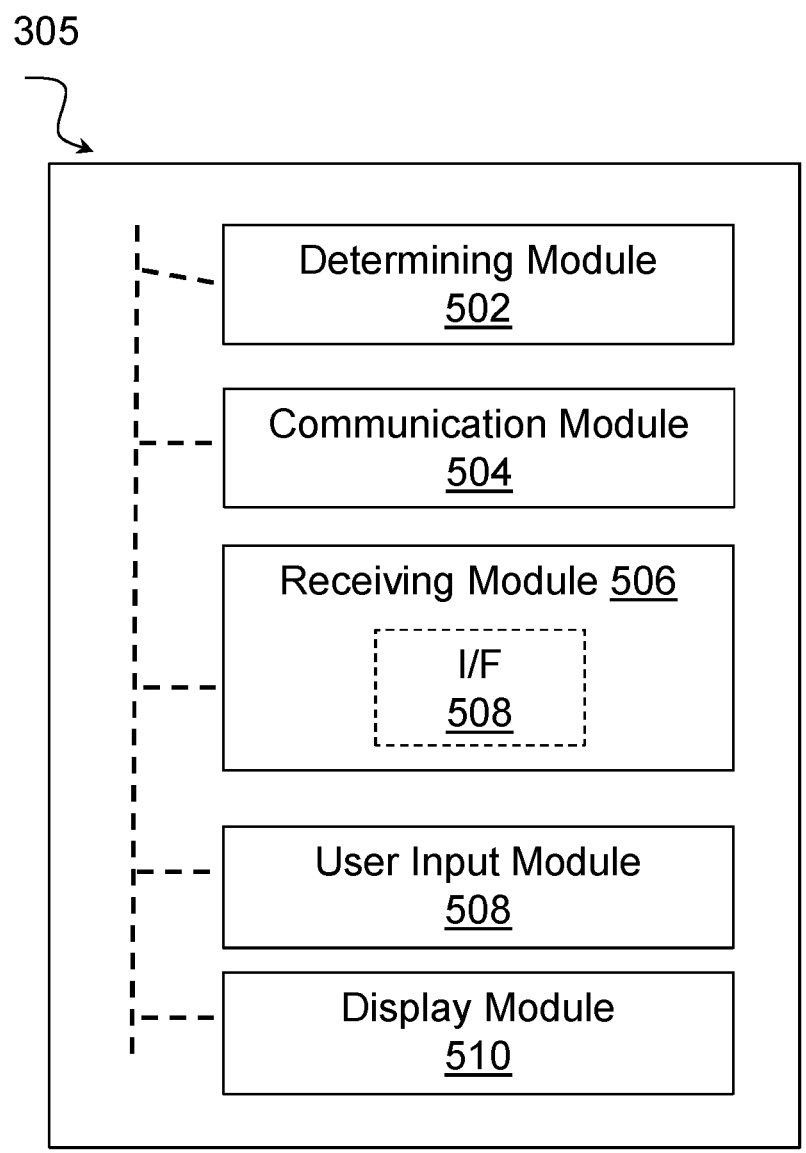
FIG. 6 illustrates examples of modules that can be included in wireless device, in accordance with certain embodiments.

FIG. 6 illustrates examples of modules that can be included in wireless device 305. In certain embodiments, wireless device 305 may include any one or more of determining module(s), communication module(s), receiving module(s), user input module(s), display module(s), and/or other suitable modules. The functionality of the modules may be integrated in a single component or separated among several components in any suitable manner. In certain embodiments, one or more of the modules may be implemented using processing circuitry 414 described with respect to FIG. 5.

The determining module may perform the processing functions of wireless device 305 (including any of the wireless device functionality to support the embodiments described herein, such as the functionality described above with respect to FIG. 2, FIG. 3, and/or further example embodiments discussed herein. As one example, the determining module may declare RLF based at least in part on information used in a beam failure monitoring procedure. For example, in certain embodiments, processing circuitry 414 may start, stop, reset, cancel, and/or put on hold a timer used in an RLF procedure (timer 310) based in part on information used in a beam failure monitoring procedure.

The determining module may include or be included in processing circuitry 414 described above in relation to FIG. 5. The determining module may include analog and/or digital circuitry configured to perform any of the functions of the determining module and/or processing circuitry described above. The functions of the determining module described above may, in certain embodiments, be performed in one or more distinct modules.

The communication module may perform the transmission functions of wireless device 305. For example, in certain embodiments the communication module may communicate uplink signals to transmission point 320, such as signals to facilitate recovery if wireless device 305 detects a problem with the radio link or beam. The communication module may include a transmitter and/or a wireless interface, such as wireless interface 412 described above in relation to FIG. 5. The communication module may include circuitry configured to wirelessly transmit messages and/or signals. In particular embodiments, the communication module may receive messages and/or signals for transmission from the determining module. In certain embodiments, the functions of the communication module described above may be performed in one or more distinct modules.

Figure 9:
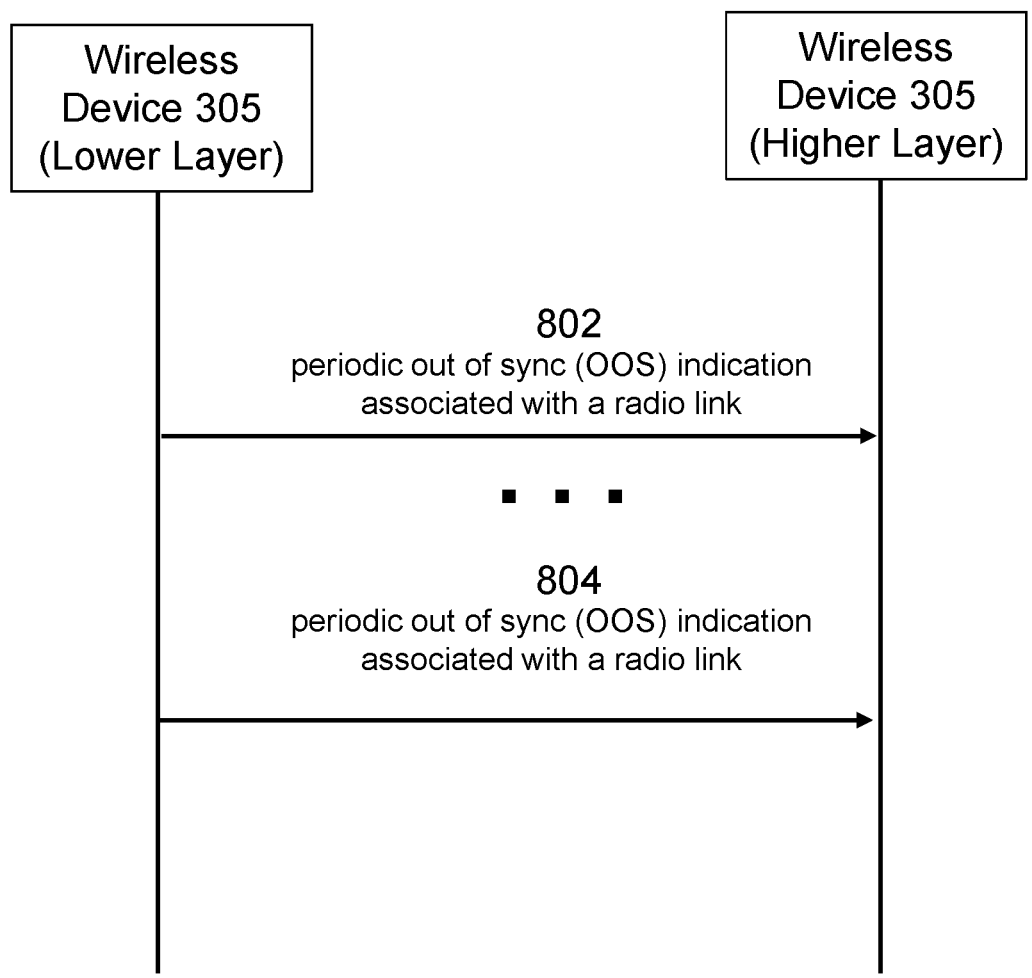
FIG. 9 illustrates a higher layer process for receiving OOS and IS indications from a lower layer process of a wireless device, in accordance with certain embodiments.

The receiving module may perform the receiving functions of wireless device 305. For example, the receiving module may receive a reference signal (RS) from a network node (e.g., transmission point 320) and may monitor the RS as a part of RLF or BLF procedures. The receiving module may include a receiver and/or a wireless interface, such as wireless interface 412 described above in relation to FIG. 5. The receiving module may include circuitry configured to wirelessly receive messages and/or signals. In certain embodiments, the receiving module may include circuitry (which may comprise one or more interfaces 502) configured to receive information from other circuitry within wireless device 305. As an example, processing circuitry 414 may use interface(s) 502 to receive information from memory 416 of wireless device 305. As another example, a higher layer process of wireless device 305 may be configured to receive OOS or IS indications from a lower layer process of wireless device 305 such as depicted with respect to FIG. 9 via one or more interfaces 502. In particular embodiments, the receiving module may communicate received messages and/or signals to the determining module. The functions of the receiving module described above may, in certain embodiments, be performed in one or more distinct modules.

In certain embodiments, wireless device 305 may optionally include a user input module that may receive user input intended for wireless device 305. For example, the user input module may receive key presses, button presses, touches, swipes, audio signals, video signals, and/or any other appropriate signals. The user input module may include one or more keys, buttons, levers, switches, touchscreens, microphones, and/or cameras. The user input module may communicate received signals to the determining module. The functions of the user input module described above may, in certain embodiments, be performed in one or more distinct modules.

In certain embodiments, wireless device 305 may optionally include a display module, which may present signals on a display of wireless device 305. The display module may include the display, and/or any appropriate circuitry and hardware configured to present signals on the display. The display module may receive signals to present on the display from the determining module. The functions of the display module described above may, in certain embodiments, be performed in one or more distinct modules.

Each module depicted in FIG. 6 may include any suitable configuration of hardware and/or software. Wireless device 305 may include additional modules beyond those shown in FIG. 6 that may be responsible for providing any suitable functionality, including any of the functionality described above and/or any additional functionality (including any functionality necessary to support the various solutions described herein).

In certain embodiments, some or all of the modules shown in FIG. 6 can be combined with one or more modules shown in FIG. 5. As an example, certain embodiments may combine at least some of the functionality of the processing circuitry (FIG. 5) with the determining module (FIG. 6). As another example, certain embodiments may combine at least some of the functionality of the wireless interface (FIG. 5) with the communication and/or receiving modules (FIG. 6).

Figure 7:
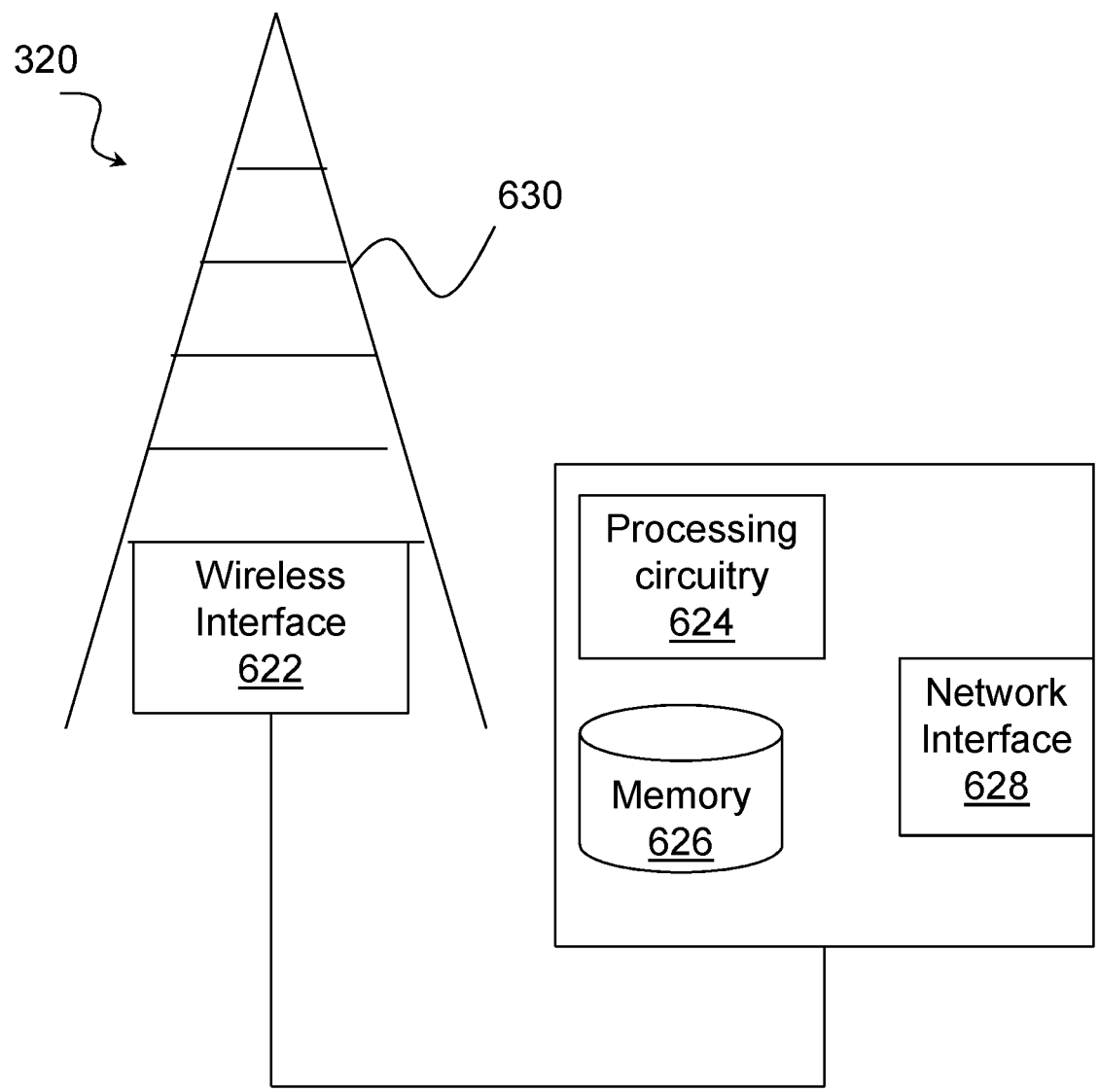
FIG. 7 illustrates an exemplary network node, such as transmission point, in accordance with certain embodiments.

FIG. 7 is a block diagram of an exemplary network node, such as transmission point 320, in accordance with certain embodiments. Transmission point 320 may include one or more of wireless interface(s) 622, processing circuitry 624 (e.g., comprising one or more processors), memory (or memories) 626, and/or network interface(s) 628. In some embodiments, wireless interface 622 comprises a transmitter that facilitates transmitting wireless signals to and a receiver that facilitates receiving wireless signals from wireless device 305 (e.g., via an antenna), processing circuitry 624 executes instructions to provide some or all of the functionality described herein as being provided by a transmission point 320, memory 626 stores the instructions executed by processing circuitry 624, and network interface 628 communicates signals to backend network components, such as a gateway, switch, router, Internet, Public Switched Telephone Network (PSTN), core network nodes or radio network controllers, etc.

Processing circuitry 624 may include any suitable combination of hardware and software implemented in one or more modules to execute instructions and manipulate data to perform some or all of the described functions of transmission point 320, such as the functions of transmitting one or more reference signals that wireless device 305 uses in a procedure for detecting an RLF or BLF, or functions of facilitating recovery of a radio link or beam. In some embodiments, processing circuitry 624 may include, for example, one or more computers, one or more central processing units (CPUs), one or more microprocessors, one or more applications, and/or other logic. In certain embodiments, processing circuitry 624 may comprise one or more of the modules discussed below with respect to FIG. 8.

Memory 626 is generally operable to store instructions, such as a computer program, software, an application including one or more of logic, rules, algorithms, code, tables, etc. and/or other instructions capable of being executed by a processor. Examples of memory 626 include computer memory (for example, Random Access Memory (RAM) or Read Only Memory (ROM)), mass storage media (for example, a hard drive), removable storage media (for example, a Compact Disc (CD) or a Digital Video Disc (DVD)), and/or or any other volatile or non-volatile, non-transitory computer-readable and/or computer-executable memory devices that store information.

In some embodiments, network interface 628 is communicatively coupled to processing circuitry 624, and network interface 628 may refer to any suitable device operable to receive input for transmission point 320, send output from transmission point 320, perform suitable processing of the input or output or both, communicate to other devices, or any combination of the preceding. Network interface 628 may include appropriate hardware (e.g., port, modem, network interface card, etc.) and software, including protocol conversion and data processing capabilities, to communicate through a network.

Other embodiments of transmission point 320 may include additional components beyond those shown in FIG. 7 that may be responsible for providing certain aspects of the transmission point 320's functionality, including any of the functionality described herein and/or any additional functionality (including any functionality necessary to support the solutions described herein). Core network node 330 may comprise similar components as those shown in FIG. 7, however, a wireless interface (e.g., wireless interface 622) is optional for the core network node 330. The various different types of network nodes may include components having the same physical hardware but configured (e.g., via programming) to support different radio access technologies, or may represent partly or entirely different physical components.

Figure 8:
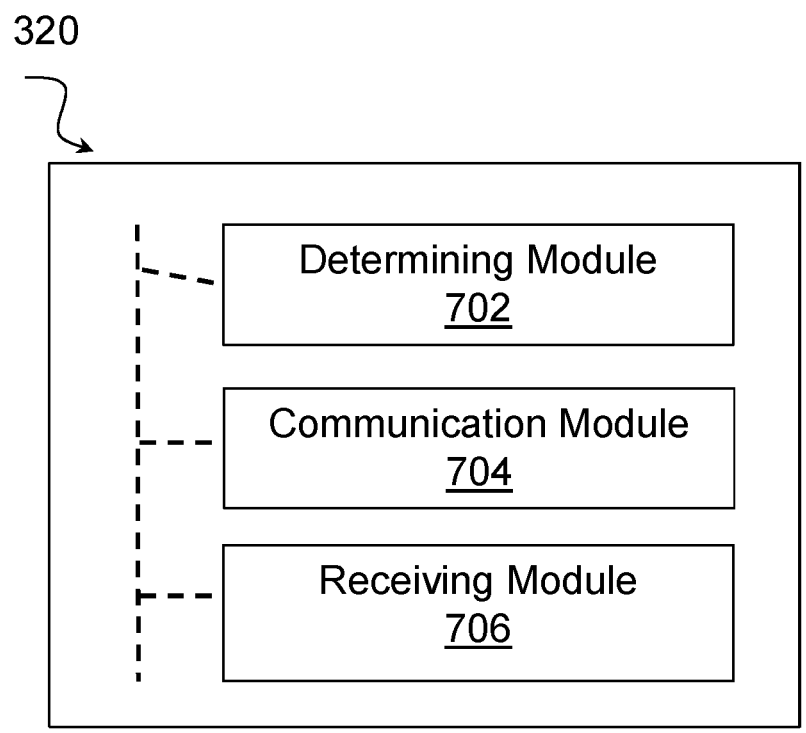
FIG. 8 illustrates examples of modules that can be included in transmission point, in accordance with certain embodiments.

FIG. 8 illustrates examples of modules that can be included in transmission point 320, in accordance with certain embodiments. In certain embodiments, transmission point 320 may include any one or more of determining module(s), communication module(s), receiving module(s), and/or other suitable modules. The functionality of the modules may be integrated in a single component or separated among several components in any suitable manner. In certain embodiments, one or more of the modules may be implemented using processing circuitry 624 described with respect to FIG. 7.

The determining module may perform the processing functions of transmission point 320 (including any of the transmission point/network node functionality to support the embodiments described herein). For example, determining module may perform determinations that facilitate recovery of a radio link or beam.

The determining module may include analog and/or digital circuitry configured to perform any of the functions of the determining module and/or processing circuitry 624 described above. The functions of the determining module described above may, in certain embodiments, be performed in one or more distinct modules.

The communication module may perform the transmission functions of transmission point 320. As one example, the communication module may transmit to wireless device 305 one or more reference signals that wireless device 305 uses in an RLF or BLF procedure. The communication module may include a transmitter and/or a wireless interface, such as wireless interface 622 described above in relation to FIG. 7. As another example, the communication module may send information to other transmission points 320. The communication module may include a network interface, such as interface 628 described above in relation to FIG. 7. The communication module may include circuitry configured to transmit wireless and/or wired messages and/or signals. In particular embodiments, the communication module may receive messages and/or signals for transmission from the determining module. In certain embodiments, the functions of the communication module described above may be performed in one or more distinct modules.

The receiving module may perform the receiving functions of transmission point 320. For example, messages from wireless device 305 may be received by the receiving module. The receiving module may include a receiver and/or a wireless interface, such as wireless interface 622 described above in relation to FIG. 7. As another example, the receiving module may receive information from other transmission points 320. The receiving module may include a network interface, such as interface 628 described in relation to FIG. 7. The receiving module may include circuitry configured to receive wireless and/or wired messages and/or signals. In certain embodiments, the receiving module may include circuitry configured to receive information from memory 624 of transmission point 320. In particular embodiments, the receiving module may communicate received messages and/or signals to the determining module. The functions of the receiving module described above may, in certain embodiments, be performed in one or more distinct modules.

In certain embodiments, some or all of the modules shown in FIG. 8 can be combined with one or more modules shown in FIG. 7. As an example, certain embodiments may combine at least some of the functionality of the processing circuitry (FIG. 7) with the determining module (FIG. 8).

Example Embodiments

1. A method for use in a wireless device includes monitoring a radio link for a radio link failure based at least in part on a first timer (e.g., T310), wherein the first timer is configured based at least in part on: periodic out of sync (OOS) indications associated with the radio link; and information obtained from monitoring a beam for a beam link failure. A radio link failure may be detected in response to expiry of the first timer;

2. The method of example embodiment 1, wherein the information obtained from monitoring the beam comprises a number ($N_{A1}$) of aperiodic OOS indications detected for the beam, and wherein the method further comprises starting the first timer in response to receiving a first number ($N_{P1}$) of the periodic OOS indications or starting the first timer in response to receiving a second number ($N_{P2}$) of the periodic OOS indications and the number ($N_{A1}$) of the aperiodic OOS indications.

3. The method of any of example embodiments 1-2, wherein the information obtained from monitoring the beam comprises an indication that a maximum number of beam recovery attempts has been reached, and wherein the method further comprises starting the first timer in response to receiving a first number ($N_{P1}$) of the periodic OOS indications or starting the first timer in response to receiving a second number ($N_{P2}$) of the periodic OOS indications and the indication that the maximum number of beam recovery attempts has been reached.

4. The method of any of example embodiments 1-3, wherein the information obtained from monitoring the beam comprises an indication that a maximum time has been spent on beam recovery, and wherein the method further comprises starting the first timer in response to receiving a first number ($N_{P1}$) of the periodic OOS indications or starting the first timer in response to receiving a second number ($N_{P2}$) of the periodic OOS indications and the indication that the maximum time has been spent on beam recovery.

5. The method of any of example embodiments 1-4, wherein the information obtained from monitoring the beam comprises an indication that a beam recovery has been attempted, and wherein the method further comprises starting the first timer in response to receiving a first number ($N_{P1}$) of the periodic OOS indications or starting the first timer in response to receiving a second number ($N_{P2}$) of the periodic OOS indications and the indication that the beam recovery has been attempted.

6. The method of any of example embodiments 1-5, wherein the second number ($N_{P2}$) of periodic OOS indications is less than the first number ($N_{P1}$) of periodic OOS indications.

[Note the value of the second number, $N_{P2}$, used in embodiment 2 may be the same or different as the value of the second number, $N_{P2}$, used in embodiments 3, 4, and 5. Similarly, embodiments 3, 4, and 5 can use the same or different values for $N_{P2}$. In implementations combining multiple embodiments, multiple "second" numbers could be used, such as one value of $N_{P2}$ for starting the first timer according to the criteria in embodiment 2, another value of $N_{P2}$ for starting the first timer according to the criteria in embodiment 3, and so on.]

7. The method of any of example embodiments 1-6, further comprising stopping, resetting, or putting the first timer on hold in response to determining that the wireless device has started beam recovery, successfully selected a downlink (DL) beam to be accessed, and/or received/detected a pre-determined number (M) of in sync (IS) indications associated with the radio link.

8. The method of example embodiment 7, wherein stopping, resetting, or putting the first timer on hold in response to determining that the wireless device has successfully selected a downlink (DL) beam to be accessed comprises one or more of:
  successfully selecting the DL beam but not yet receiving a response from the network confirming the successful recovery;
  successfully selecting the DL beam but not yet receiving a re-configuration from the network upon beam recovery; and/or
  successfully selecting the DL beam, sending a recovery attempt, receiving a confirmation from the network of a successful recovery via a response message or via a re-configuration message or a combined response/Reconfiguration message.

9. The method of any of example embodiments 1-8, further comprising detecting the radio link failure in response to one or more of the following:
  receiving an indication of a random access problem from medium access control (MAC) while none of T300, T301, T304 or T311 is running;
  determining that a number of radio link control (RLC) retransmissions exceeds a pre-determined threshold.

10. A wireless device (305), comprising:
  one or more interfaces (502) configured to:
    receive periodic out of sync (OOS) indications associated with a radio link; and
    receive information obtained from monitoring a beam for a beam link failure; and
  processing circuitry (414) configured to:
    monitor a radio link for a radio link failure based at least in part on a first timer (e.g., T310), wherein the first timer is configured based at least in part on the periodic OOS indications, the periodic IS indications, and the information obtained from monitoring the beam for the beam link failure; and
    detect a radio link failure in response to expiry of the first timer.

11. The wireless device of example embodiment 10, further operable to perform any of example embodiments 2-9.

12. A computer program product comprising a non-transitory computer readable storage medium (416) having computer readable program code embodied therein, the computer readable program code comprising:
  computer readable program code for monitoring a radio link for a radio link failure based at least in part on a first timer (e.g., T310), wherein the first timer is configured based at least in part on:
    periodic out of sync (OOS) indications associated with the radio link; and
    information obtained from monitoring a beam for a beam link failure; and
  computer readable program code for detecting a radio link failure in response to expiry of the first timer.

13. The computer program product of example embodiment 12, further comprising computer readable program code for performing any of example embodiments 2-9.

Although terminology from 3GPP has been used in this disclosure to exemplify the invention, this should not be seen as limiting the scope of the invention to only the aforementioned system. Other wireless systems, such as LTE, 5G/NR, WCDMA, WiMax, UMB and GSM, or future evolutions of the foregoing, may also benefit from exploiting the ideas covered within this disclosure. Terminology used in the discussion of certain radio access technologies may encompass terminology used to cover analogous features in other radio access technologies.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method for use in a wireless device, the method comprising:
   starting a first timer for monitoring a radio link for a radio link failure, wherein the first timer is started based at least in part on:
      one or more periodic out of sync (OOS) indications associated with the radio link; and
      aperiodic indications obtained from monitoring a beam for a beam link failure; and
   declaring the radio link failure in response to expiry of the first timer, and
   wherein the aperiodic indications obtained from monitoring the beam comprise an indication that a maximum number of beam recovery attempts has been reached, and
   wherein the first timer is started in response to:
      receiving a first number (NP1) of the one or more periodic OOS indications; and/or
      receiving a second number (NP2) of the one or more periodic OOS indications and the indication that the maximum number of beam recovery attempts has been reached.

2. The method of claim 1, further comprising:
   determining that a total number of OOS indications is greater than a threshold,
   wherein the total number of OOS indications is a function of the one or more periodic OOS indications and the aperiodic indications.

3. The method of claim 2, wherein each aperiodic indication is given more weight than each of the one or more periodic OOS indications in the function.

4. The method of claim 1, wherein the first timer is configured to be started:
   in response to receiving a first number (NP1) of the one or more periodic OOS indications; and/or
   in response to receiving a second number (NP2) of the one or more periodic OOS indications and a number (NA1) of the aperiodic indications.

5. The method of claim 1, further comprising:
   performing a determination that a first number (NP1) of the one or more periodic OOS indications is greater than a threshold, wherein a single one of the aperiodic indications replaces at least two periodic OOS indications in the determination.

6. The method of claim 1, wherein the aperiodic indications obtained from monitoring the beam comprises an indication that a maximum time has been spent on beam recovery, and wherein the first timer is started in response to:
   receiving a first number (NP1) of the one or more periodic OOS indications; and/or
   receiving a second number (NP2) of the one or more periodic OOS indications and the indication that the maximum time has been spent on beam recovery.

7. The method of claim 1, further comprising:
   stopping, resetting, or putting the first timer on hold in response to the wireless device performing at least one of:
   starting beam recovery,
   successfully selecting a downlink (DL) beam to be accessed, and
   receiving or detecting a pre-determined number of in sync (IS) indications associated with the radio link.

8. The method of claim 7, wherein the first timer is stopped, reset, or put on hold in response to determining that the wireless device has successfully selected the DL beam to be accessed, and the method further comprises one or more of:
   successfully selecting the DL beam but not yet receiving a response from the network confirming the successful recovery;
   successfully selecting the DL beam but not yet receiving a re-configuration from the network upon beam recovery; and
   successfully selecting the DL beam, sending a recovery attempt, receiving a confirmation from the network of a successful recovery via a response message or via a re-configuration message or a combined response/Re-configuration message.

9. The method of claim 7, further comprising:
   detecting successful beam recovery; and
   canceling the first timer.

10. The method of claim 7, wherein the first timer is stopped, reset, or put on hold in response to the wireless device receiving or detecting a pre-determined number of in sync (IS) indications associated with the radio link, and wherein the pre-determined number of IS indications comprises:
    a number of periodic IS indications.

11. The method of claim 1, wherein the radio link failure is declared in response to the wireless device performing one or more of the following:
    receiving an indication of a random access problem from medium access control (MAC) while the first timer is not running; and
    determining that a number of radio link control (RLC) retransmissions exceeds a pre-determined threshold.

12. A wireless device, comprising:
    one or more interfaces configured to:
       receive one or more periodic out of sync (OOS) indications associated with a radio link; and
       receive aperiodic indications obtained from monitoring a beam for a beam link failure; and
    processing circuitry configured to:
       starting a first timer for monitoring the radio link for a radio link failure, wherein the first timer is started based at least in part on the one or more periodic OOS indications and the aperiodic indications obtained from monitoring the beam for the beam link failure; and
       declare the radio link failure in response to expiry of the first timer, and
    wherein the aperiodic indications obtained from monitoring the beam comprise an indication that a maximum number of beam recovery attempts has been reached, and
    wherein the processing circuitry is configured to start the first timer in response to:
       receiving a first number (NP1) of the one or more periodic OOS indications; and/or
       receiving a second number (NP2) of the one or more periodic OOS indications and the indication that the maximum number of beam recovery attempts has been reached.

13. The wireless device of claim 12, wherein the processing circuitry is configured to:
    determine that a total number of OOS indications is greater than a threshold,
    wherein the total number of OOS indications is a function of the one or more periodic OOS indications and the aperiodic indications.

14. The wireless device of claim 13, wherein each aperiodic indication is given more weight than each of the one or more periodic OOS indications in the function.

15. The wireless device of claim 12, wherein the first timer is configured to be started:
- in response to receiving a first number (NP1) of the one or more periodic OOS indications; and/or
- in response to receiving a second number (NP2) of the one or more periodic OOS indications and a number (NA1) of the aperiodic indications.

16. The wireless device of claim 12, wherein the processing circuitry is configured to:
- perform a determination that a first number (NP1) of the one or more periodic OOS indications is greater than a threshold, wherein a single one of the aperiodic indications replaces at least two of the one or more periodic OOS indications in the determination.

17. The wireless device of claim 12, wherein the aperiodic indications obtained from monitoring the beam comprises an indication that a maximum time has been spent on beam recovery, and wherein the first timer is started in response to:
- receiving a first number (NP1) of the one or more periodic OOS indications; and/or
- receiving a second number (NP2) of the one or more periodic OOS indications and the indication that the maximum time has been spent on beam recovery.

18. The wireless device of claim 17, wherein the second number (NP2) of one or more periodic OOS indications is less than the first number (NP1) of one or more periodic OOS indications.

19. The wireless device of claim 12, wherein the processing circuitry is configured to:
- stop, reset, or put the first timer on hold in response to the wireless device performing at least one of:
- starting beam recovery,
- successfully selecting a downlink (DL) beam to be accessed, and
- receiving or detecting a pre-determined number of in sync (IS) indications associated with the radio link.

20. The wireless device of claim 19, wherein the first timer is stopped, reset, or put on hold in response to determining that the wireless device has successfully selected the DL beam to be accessed, and the processing circuitry is configured to perform one or more of:
- successfully selecting the DL beam but not yet receiving a response from the network confirming the successful recovery;
- successfully selecting the DL beam but not yet receiving a re-configuration from the network upon beam recovery; and
- successfully selecting the DL beam, sending a recovery attempt, receiving a confirmation from the network of a successful recovery via a response message or via a re-configuration message or a combined response/Re-configuration message.

21. The wireless device of claim 19, wherein the processing circuitry is configured to:
- detect a successful beam recovery attempt; and
- cancel the first timer.

22. The wireless device of claim 19, wherein the first timer is stopped, reset, or put on hold in response to the wireless device receiving or detecting the pre-determined number of in sync (IS) indications associated with the radio link, and wherein the pre-determined number of IS indications comprises:
- a number of periodic IS indications, and
- a number of aperiodic IS indications.

23. The wireless device of claim 12, wherein the radio link failure is detected in response to one or more of the following:
- receiving an indication of a random access problem from medium access control (MAC) while the first timer is not running; and
- determining that a number of radio link control (RLC) retransmissions exceeds a pre-determined threshold.

* * * * *